Feb. 12, 1924.  
R. V. MORSE  
1,483,235  
SYSTEM FOR TRANSMITTING SETTINGS  
Filed July 26, 1919   3 Sheets-Sheet 3

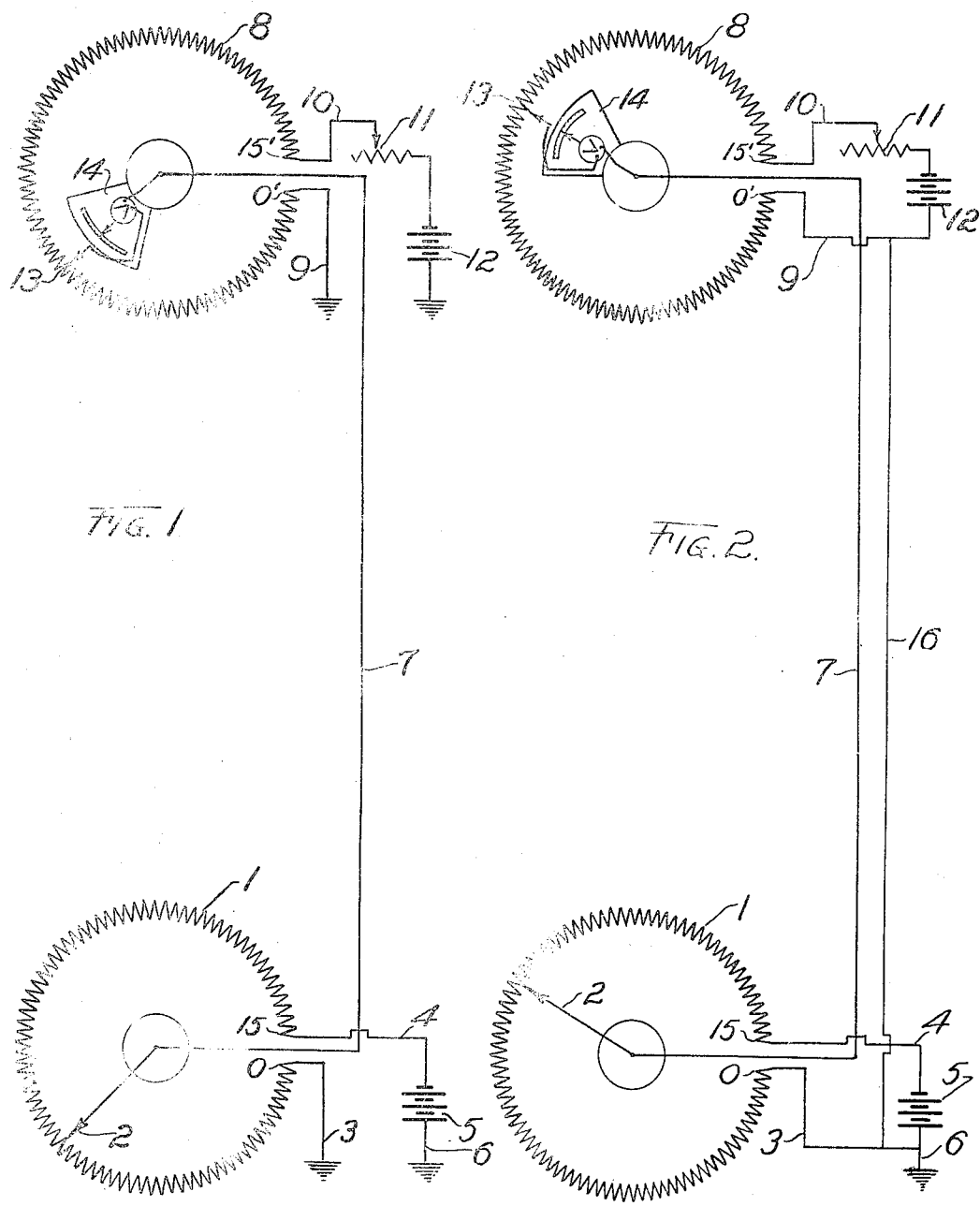

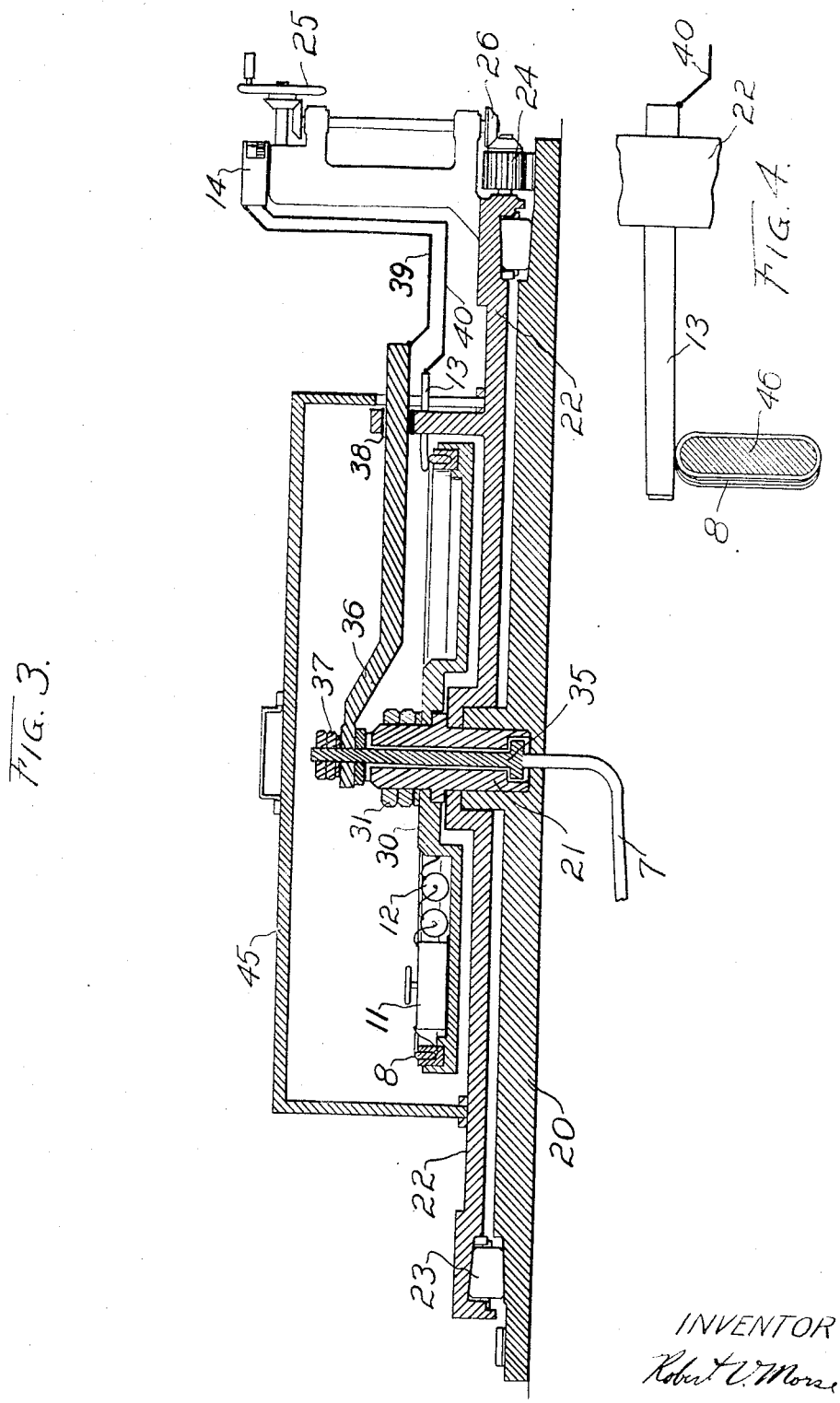

Adjustable Pivot

INVENTOR  
Robert V. Morse

Patented Feb. 12, 1924.

1,483,235

UNITED STATES PATENT OFFICE.

ROBERT V. MORSE, OF ITHACA, NEW YORK, ASSIGNOR TO MORSE INSTRUMENT COMPANY, INC., OF ITHACA, NEW YORK, A CORPORATION OF NEW YORK.

SYSTEM FOR TRANSMITTING SETTINGS.

Application filed July 26, 1919. Serial No. 313,506.

*To all whom it may concern:*

Be it known that I, ROBERT V. MORSE, a citizen of the United States, residing at Ithaca, in the county of Tompkins and State of New York, have invented a new and useful System for Transmitting Settings, of which the following is a specification.

This invention relates to the transmitting of settings from one instrument to another, and is applicable for example to the control of ordnance when firing at a moving target, such as an airplane. In such cases it is often desirable that the automatic instruments which determine the gun settings should be located at some distance from the guns themselves. One object of this invention is to transmit the settings from the computing instruments to the various guns in a simple and direct manner. Another object is to entirely dispense with sighting apparatus at the guns, if desired. Various other objects will be apparent as the description proceeds.

Figure 5:
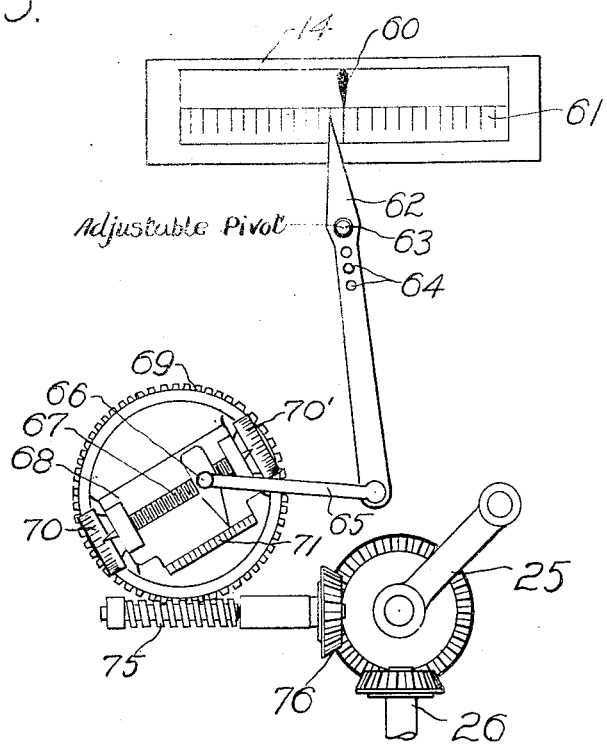
Figure 6:
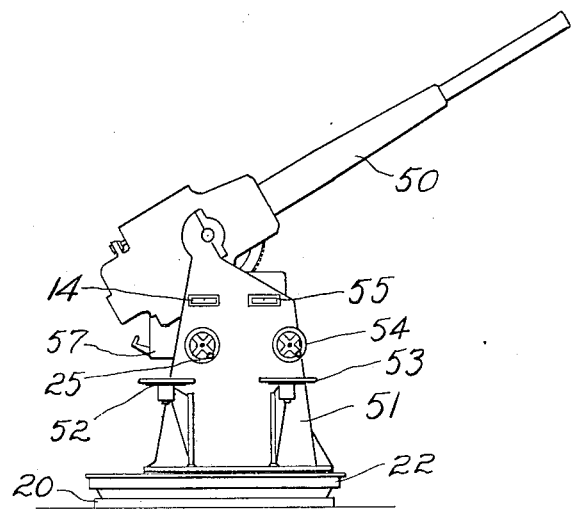

Referring now to the drawings, Fig. 1 shows in a diagrammatic form one method of transmitting settings under this system, using a single transmitting wire; Fig. 2 shows a variation in which two transmitting wires are used. Fig. 3 shows in cross-section one form of the actual receiving mechanism, such as is shown diagrammatically at the top of Fig. 1 and Fig. 2; and Fig. 4 is a detail view, partly in cross-section, of the contact finger in Fig. 3. One form of parallax correcting mechanism is shown in Fig. 5; and Fig. 6 shows an anti-aircraft gun equipped with the receiving instruments so that it can be elevated and trained directly according to the settings transmitted from a central control station, thus dispensing with any sighting apparatus at the gun itself.

In the transmitting of settings, we have in general a sending instrument and one or more receiving instruments, to which the sending instrument is connected by transmission lines. Referring now to Fig. 1, the sending instrument consists of a resistance 1, a movable contact point 2, a lead 3 connecting one end of the resistance 1 to the ground, and a lead 4 connecting the other end of the resistance 1 to a source of E. M. F., such as the battery 5, which is in turn connected to the ground by the lead 6. The transmission line 7 runs from the movable contact point 2 to the receiving instrument or instruments. The movable contact point 2 can be swung to any point on the resistance 1, so that the transmission line 7 can be given any voltage from zero to the full voltage of the battery, depending on the position of the contact point 2.

The receiving instrument shown in Fig. 1 consists of a resistance 8, similar to the resistance 1 of the sending instrument, having one end connected to the ground by the lead 9, and the other end connected by the lead 10 to the variable resistance 11, which in turn is connected to the battery 12 and thence to the ground. Connected to the contact point 13, and movable therewith, is the voltmeter 14, which is also connected to the line 7. The zero of the voltmeter is arranged at the center of the scale, so that the voltmeter reads positive and negative voltages. As the contact point 13 is moved around the resistance 8, the voltmeter 14 moves bodily with the contact point 13, and the needle of the voltmeter 14 responds to the difference in voltage between the contact point 13 and the line 7.

The general operation is as follows. First, the sending and receiving instruments are adjusted to each other by setting the movable contact point 2 at the point 0 on the resistance 1, and placing the contact point 13 at the corresponding point 0' on the resistance 8. The needle of the voltmeter 14 should now read zero, since both the points 0 and 0' are connected to the ground. The contact point 2 is then placed at the point 15 on the resistance 1, and the contact point 13 is placed at the point 15' on the resistance 8. If the voltage at the points 15 and 15' is the same, the voltmeter 14 will read zero. If the voltmeter 14 does not read zero, the resistance 11 is adjusted by hand until the voltmeter 14 does read zero. The apparatus is now ready for use.

Assume the contact point 2 has been moved to some particular point as shown in Fig. 1, for example. If the contact point 13 is at a different position on the resistance 8, the voltage of the contact points 2 and 13 will be different, and this will actuate the voltmeter 14,—whose needle is arranged to swing in the direction that the contact point 13 should be moved. The operator at the receiving instrument accordingly moves the contact point 13 in the direction indicated by the needle of the voltmeter 14, until the voltmeter reading is zero. Since the resistances 1 and 8 are similar thruout, this indicates that the contact point 13 is at the same position on the receiving instrument as the point 2 is on the sending instrument. This makes possible the accurate transmission of settings or readings. If the contact point 2 is now moved, as where the setting is varying continuously, the voltmeter 14 will immediately indicate which way the contact point 13 should be moved; and the operator at the receiving instrument can keep his settings in strict accord with those of the sending instrument by simply moving his contact point 13 so as to keep the voltmeter 14 at zero. Thus the settings of the sending instrument are readily followed by the receiving instrument.

The apparatus in Fig. 2 is similar in general to that described in connection with Fig. 1, the only difference being that in addition to the main line wire 7 a ground wire 16 is provided, which connects up the grounded sides of the cells and resistances so that only one actual ground terminal need be employed. Various other modifications of the apparatus shown in Fig. 1 will be obvious to the skilled engineer,—for example, both the sending and the receiving resistances might be fed from the same set of cells, thus dispensing with the variable resistance 11; but in all such cases the resistance of the connecting line must be carefully balanced, in order to make sure that the voltage impressed on the points 15 and 15′ is the same. If the connecting lines do not have their resistances carefully balanced, the regulating resistance 11 must be employed when a single battery is used, in the same manner as when two separate batteries are used. The resistance of the main transmitting line 7 is immaterial, for the reason that it carries no current at the reading positions,—merely a voltage. The fact that the resistance of the main line 7 can be disregarded is of considerable practical importance in the field, since it dispenses with specially calibrated leads and permits the instruments to be connected with ordinary wires.

The device which has been described may be constructed in many different forms, depending on the use for which it is intended. In general it is applicable to any installation where it is desired to secure an angular relation at a receiving instrument corresponding to an angular relation at a sending instrument. In order to show one such application, the apparatus will be described in connection with the pointing of ordnance.

Fig. 3 shows a receiving apparatus mounted on a rotatable gun platform, which is provided with operating gearing so that the gun (not shown) can be trained in azimuth. The size of the receiving apparatus is exaggerated as compared with the control gearing on the platform, in order to give greater clarity of detail in the drawing. Referring now to Fig. 3, the stationary base plate 20 rests upon the foundation and is provided with the central pivot 21. Mounted to rotate around this pivot 21 is the platform 22, whose rim is carried on the rollers 23. A gear 24 is carried on a stud attached to the rim of the platform 22, this gear 24 being operated from the control wheel 25 thru the connecting gearing 26, which is carried in a bracket extending from the platform 22. The gear 24 engages teeth extending around the rim of the base plate 20, so that the platform 22 may be rotated relative to the base plate 20 by operating the control wheel 25.

The disk plate 30 is locked to a flange on the pivot 21, by means of the lock-nuts 31. The disk 30 carries in its rim the resistance 8, (which will be described more in detail later), the rheostat 11, and the dry cells 12,—the resistance 8 being connected by a suitable lead to the rheostat 11, which is in turn connected to the dry cells 12. The dry cells 12 are connected in series, with the last terminal grounded on the disk 30. The disk plate 30 is grounded thru being locked to the pivot 21, which is a part of the base 20.

Within the pivot 21 is a bolt 35, which is connected to the main transmitting line 7 but insulated from the pivot 21 and base 20. The bolt 35 passes thru a hole in one end of a conducting bar 36, which is arranged so that it may rotate around the bolt 35. Lock-nuts 37, with a copper washer, insure a good electrical contact between the bolt 35 and the conducting arm 36. The arm 36 is supported in an insulated socket 38 which is carried on the rotatable platform 22, and a lead 39 runs from the conducting arm 36 to the voltmeter 14, which is carried on an extension of the platform 22. The lead 40 runs from the voltmeter 14 to the contact finger 13, which passes thru an insulated socket supported on the rotatable platform 22 and contacts with the wires of the resistance 8,—as is shown on a larger scale in Fig. 4. It will be noted that the arm 36, voltmeter 14, and contact finger 13 all rotate with the platform 22, while the resistance 8 carried on the disk plate 30 is normally stationary. A cover 45 rests on the rotatable platform 22 and encloses the apparatus,—this cover being provided with a slot in one side thru which the arm 36 and finger 13 extends.

The resistance 8,—a portion of which is shown in cross section in Fig. 4,—consists of a large number of turns of resistance wire wound closely about a core 46. The core 46, as shown in Figs. 1, 2, and 3, is circular and extends like a ring around the rim of the plate 30. The upper part of the resistance wires 8, where the finger 13 contacts with them, is bare; but the rest of the resistance wires and core is embedded in an annular block of insulation which rests in a groove in the rim of the plate 30. The purpose of winding the resistance wire over and under around the core 46 is to obtain an appreciable difference in resistance between one contact point and the next, to increase the accuracy of the instrument. With such a winding the instrument has an accuracy corresponding to the spacing of the wire. One end of the resistance wire 8 is connected to the rheostat 11, while the other end of the resistance 8 is grounded by connecting it directly to the plate 30, which is grounded thru the pivot 21 and base 20.

The construction of the sending instrument is substantially the same as the receiving instrument above described, except that the rheostat 11 and voltmeter 14 are omitted,—a direct electrical connection taking their place. The general operation is as described in connection with Fig. 1. When the receiving instrument is first set up for use, the lock-nuts 31 are loosened, and the disk plate 30 is turned until it lies in the desired position relative to the sending instrument; the normal position is with the point 0 of the resistance 1 and the point 0' of the resistance 8 pointing in the same direction. After precise parallelism of these zero indications has been obtained, the disk 30 is locked in position by the lock-nuts 31, and requires no further attention. The adjustment of the electrical system can be tested at any time as described in connection with Fig. 1.

When the receiving mechanism shown in Fig. 3 is operating, a slight current flows from the battery 12 thru the rheostat 11 to one terminus of the resistance 8, then around thru the resistance 8, which traverses the rim of the disk plate 30, to the other terminus of the resistance 8, which is grounded to the plate 30, which is grounded thru the pivot 21 and base 20. The voltage from the main transmitting line 7 is carried thru the bolt 35 and arm 36 and lead 39 to the voltmeter 14, and then thru the lead 40 to the contact finger 13, which makes electrical contact with some portion of the resistance 8. The direction in which the platform 22 should be rotated is indicated at the voltmeter 14, and it is the duty of the man at the control wheel 25 to rotate the platform 22 so as to keep the needle of the voltmeter 14 at the central zero position. This insures that the platform 22 has the same position in azimuth as the sending instrument. A similar sending and receiving apparatus is connected to the elevating gearing of the gun, so that by another voltmeter placed in front of the elevating control wheel the elevation of the gun can be maintained in accord with the angles sent out by the sending instrument. A gun so equipped is illustrated in Fig. 6, in which an anti-aircraft gun 50 is carried in the mount 51, and secured to the rotatable platform 22 which lies on the fixed base 20. The gun pointer who trains the gun in azimuth occupies the seat 52 before the training control wheel 25, and operates his control wheel 25 so as to keep the needle of the voltmeter 14 at the central or zero position; he does this by rotating the gun platform in the direction indicated by the pointer of the voltmeter 14. The gun pointer who occupies the seat 53 controls the angle of elevation of the gun 50 by operating the control wheel 54 so as to maintain the pointer of the voltmeter 55 in the central or zero position. It will be understood that the positions in azimuth and elevation thus given the gun are final or ultimate values, and no further deflections are set at the gun, since all the various corrections for the curvature of the trajectory, atmospheric conditions, motion of the target etc., are determined and included in the setting transmitted from the sending instrument. All sighting and deflection apparatus at the gun can thus be dispensed with. The gun in Fig. 6 is shown provided with an automatic fuse-setter 57, which is operated from the elevating controls of the gun, and employs one man. The entire gun control crew, aside from the men occupied in loading and firing, can thus be reduced to three men.

The apparatus thus far described was designed to produce angular settings at the receiving instruments precisely parallel to those at the sending instrument. While this might be perfectly satisfactory with guns within one hundred yards of the sending instrument, as on a ship or in a coast defense battery, it is often desirable to have the guns distributed over a greater area, and when the guns are at a greater distance from the sending instrument a correction for parallax must be introduced in order to make the guns shoot at the point at which the sending instrument is directed. This parallax correction varies with the direction of the target relative to the line connecting the sending and receiving instruments, the distance apart of the sending and receiving instruments, and the range of the target. In order to simplify the apparatus an average or mean firing range is sometimes assumed; or the apparatus may be constructed for a particular distance from the sending to the receiving instrument. It can be constructed however to correct with variations in all three variables. Such a mechanism is shown in Fig. 5.

In Fig. 5 the receiving voltmeter 14 has a needle or pointer 60 which travels over the scale 61 and indicates the proper setting of the receiving instrument as has been described. This pointer 60 is shown at its central or zero position. The secondary pointer 62 is employed to indicate the proper parallax correction. This pointer 62 is mounted on the pivot 63, which is located for an average or mean range of target. It can however be adjusted for other ranges by pulling the pivot pin 63 out of its socket and inserting it thru other holes 64 in the pointer 62,—thus changing the amplitude of motion of the pointer 62. A link 65 connects the lower end of the pointer 62 to an adjustable crank pin 66, which is mounted on a screw 67 carried in a frame 68 secured to the face of a gear 69. The eccentricity of the pin 66 relative to the axis of the gear 69 can be varied by turning the screw 67 by means of the micrometer heads 70 or 70'. The larger graduations of the micrometer are read on the scale 71, and the smaller graduations are provided on the micrometer heads 70 and 70'. Two heads 70 and 70' are provided for convenience, since at certain positions of the gear 69 one of the heads is hidden behind the link 65. The gear 69 is rotated by the worm 75 driven from the gear 76, which meshes with a gear operated by the control wheel or lever 25, which also turns the gear 26. The gearing 26 it will be recalled by reference to Fig. 3 operates the training gearing to rotate the whole mechanism in azimuth.

The operation is as follows: the pivot point 63 having been set for the range, or for the mean range, the crank pin 66 is adjusted according to the distance between the sending instrument and the receiving instrument. The worm gearing 69—75 is arranged so that the screw 67 will be vertical and the pointer 62 at the center or zero of the scale 61 when the gun has been traversed so as to point along the line connecting the sending and receiving instruments,—since in that position the parallax in azimuth is zero, (though the parallax in elevation is a maximum). Now as the control handle 25 is operated and the gun turned in azimuth to follow a target, the gearing 76 and worm 75 rotate the gear 69 and crank pin 66, so that the movement of the link 65 swings the pointer 62, which indicates the parallax correction on the scale 61. The operator at the control 25, instead of maintaining the pointer 60 of the voltmeter 14 at the center or zero of the scale 61, keeps the pointer 60 directly over the tip of the pointer 62. The parallax correction is thus introduced in the training of the gun. A similar mechanism, though arranged to have its maximum come at quadrature to that of the training mechanism, is applied to the elevating control mechanism, to correct for the parallax in the angles of elevation of the gun. By applying these parallax corrections automatically at the guns, instead of at the central computing and sending instrument, a single computing and sending instrument will suffice for a large number of guns, wherever they may be located.

In describing the parallax correcting mechanism of Fig. 5 the screw 67 has been treated as setting the adjustment for distance from the central instrument, and the adjustable pivot 63 as setting the adjustment for range. But it will be noted that these adjustments may be interchanged, and the screw 67 might be set for range, and the pivot pin 63 set for distance between gun and sending instrument.

In applying the mechanism shown in Fig. 1 to the elevating mechanism of a gun for example, it must not be supposed that the angular motion of the contact point 13 must necessarily be equal to the angular motion of the gun, since by suitable proportioning of the gearing the contact point 13 might travel substantially 360° around the resistance 8 while the gun was elevating from zero to ninety degrees elevation. Also, in special instances if desired the spacing of the resistance wires 8 may be non-uniform.

The sending and receiving resistances are sometimes referred to herein as circular resistances: this does not mean that they are arranged necessarily in exact or complete circles, but merely that they are arranged in general in a circular manner,—that is, in longer or shorter arcs around some center of rotation. The contact has been described as moving around on a stationary resistance, but it is obvious that the same result may be obtained by having the contact stationary and moving the resistance around, since there would be the same relative motion between the two elements. In the foregoing the invention has been described in a particular form for the purpose of illustration, but it will be obvious to those skilled in the art that it is susceptible to various modifications and adaptations without departing from the scope of the invention as outlined in the following claims.

I claim:

1. In a control system the combination of a rotatable carriage, a sending device arranged at a distance from the carriage and settable in accordance with the setting desired for the carriage, means for indicating when the setting of the carriage corresponds to the setting of the sending device including a movable member and a cooperating scale having a zero point and auxiliary means operated with the rotation of the carriage for introducing a correction for parallax, said auxiliary means including means cooperating with the zero on the scale to indicate said correction.

2. In an indicating system, the combination of a pivot, a carriage mounted to rotate about the pivot, a support, means for locking the support to the pivot in various positions, a contact, a resistance arranged on the support so that the contact may make electrical connection with it at various points as the carriage is rotated, a transmission line, a conducting member connected to the line and extending thru the pivot but insulated from the pivot, an indicating instrument susceptible to differences in potential, an electrical connection between the conducting member and the indicating instrument, an electrical connection between the indicating instrument and the contact, means for applying a potential difference to the terminals of the resistance, a variable resistance in series with the first mentioned resistance whereby the applied potential may be precisely regulated, and a sending instrument connected to the transmission line.

3. In an indicating system, the combination of a resistance, means for applying a potential difference to the terminals of the resistance, a transmission line, a contact capable of having various positions relative to the resistance and connecting the resistance to the transmission line, whereby voltages corresponding to said various positions are supplied to the transmission line, a receiving apparatus at the other end of the transmission line comprising a corresponding resistance and contact, means independent of the power in said transmission line for moving the receiving contact relative to the receiving resistance, an indicating instrument of the voltmeter type connected between the last mentioned contact and the line, means for applying a potential difference to the terminals of the last mentioned resistance, and an adjustable resistance in series with the last mentioned resistance whereby the last named potential difference may be made equal to the first mentioned potential difference, so that the voltages applied to the two ends of the transmission line are precisely balanced when the contacts at the two ends are in corresponding positions, whereby there is no curent flow in the transmission line when the setting is transmitted and the precision of the transmission is made wholly independent of the length of the transmission line.

In witness whereof I have hereunto set my hand this 24th day of July, 1919.

ROBERT V. MORSE.

Witnesses:
 JOHN A. PETERS,
 WM. H. MILLER.